Sept. 11, 1956 W. R. LORBER 2,762,635
TUBE AND HEADER CONNECTIONS
Filed Feb. 15, 1951 2 Sheets-Sheet 1
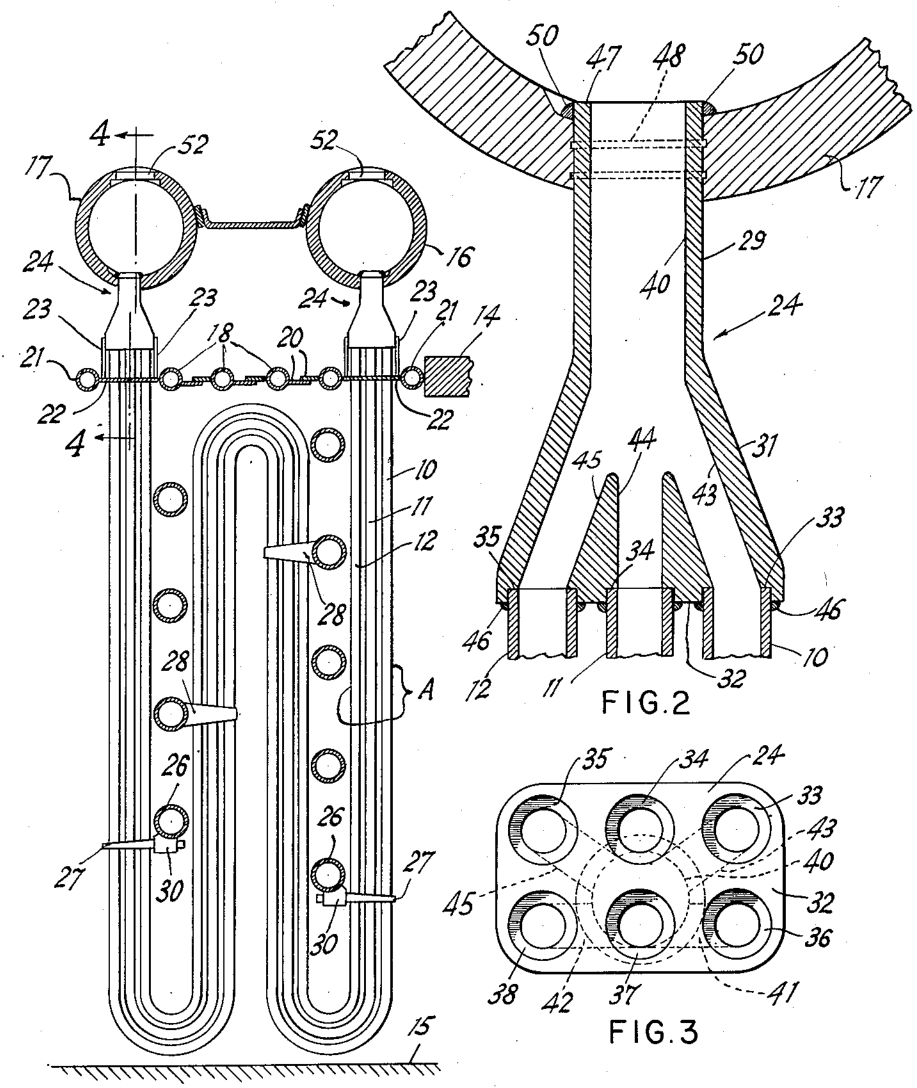
INVENTOR
William R. Lorber
BY
A. P. Moran
ATTORNEY TUBE AND HEADER CONNECTIONS
Filed Feb. 15, 1951 2 Sheets-Sheet 2
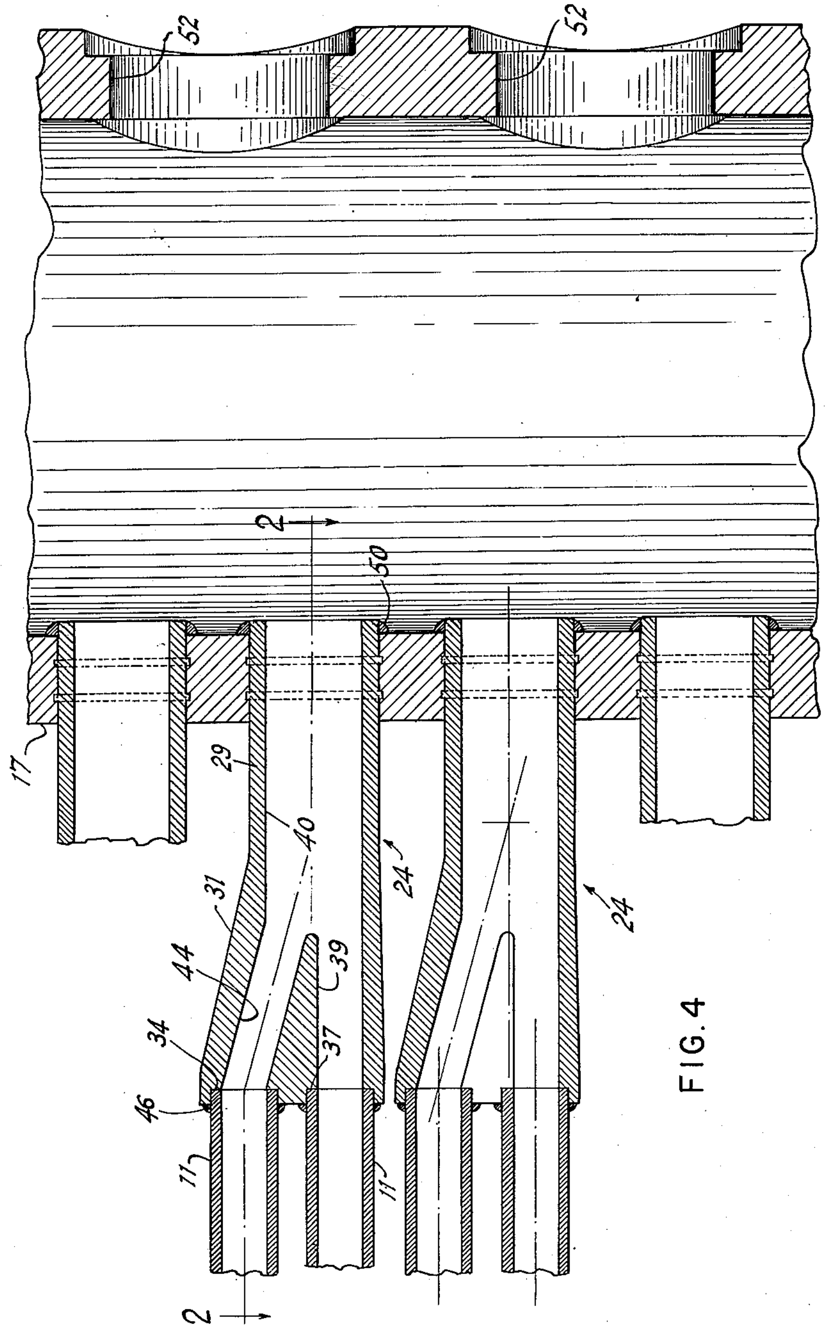
INVENTOR
William R. Lorber
BY
J. P. Moran
ATTORNEY United States Patent Office 2,762,635

Patented Sept. 11, 1956

2,762,635

TUBE AND HEADER CONNECTIONS

William R. Lorber, Barberton, Ohio, assignor to The Babcock & Wilcox Company, Rockleigh, N. J., a corporation of New Jersey Application February 15, 1951, Serial No. 211,043

3 Claims. (Cl. 285—155)

The present invention relates to fluid heat transfer apparatus, and more particularly to a manifold for connecting tubes and headers operative under high temperature and high pressure conditions.

In the generating and superheating of a vapor, such as steam, the weight and space occupied by the unit must be kept at a minimum for economical reasons. Advantageously the superheater consists of a multiplicity of closely spaced small diameter tubes, and the superheater headers are likewise of a small diameter with their diameter selected to be consistent with a permissible pressure drop for the designed steam flow rates, good steam flow distribution and at the same time sufficient in size to provide adequate ligament strength between tube seats and access to the interior of the headers.

With high pressures and superheat temperatures it has become increasingly important to attain a fluid tight connection between the superheater tubes and the headers. Welding has been increasingly used to supplement tube expanding in insuring fluid tight tube and header connections. Internal welding of the tubes to the tube seats in a header has necessitated reasonable access to the interior of the headers so as to attain suitable fluid tight connections.

In accordance with my present invention I provide a novel manifold element which is constructed and arranged to provide an efficient fluid tight connection between the superheater tubes and the headers without the necessity for increasing the diameter of the headers to accommodate the increased number of superheater tube connections therewith. The manifold is formed from suitable metal, which is constructed with a hollow cylindrical neck portion and a base portion increasing in cross-sectional area from said neck. The small diameter, closely spaced superheater tubes are inserted in recesses in the base of the manifold with the recesses spaced to correspond with the spacing of the superheater tube rows. The manifold base portion is drilled to provide converging flow passageways for each of the superheater tube connections therewith, with the passageways merging into a single passageway passing through the neck portion of the manifold. The cross-sectional area of the neck passageway is substantially equal to the total cross-sectional area of the superheater tubes entering the manifold base. The superheater tubes are individually welded into the manifold base to provide a fluid tight connection therewith while the neck portion of the manifold is passed through a corresponding machined opening in a header wall, expanded in place and internally welded with a circumferential seal weld to the header wall to provide a fluid tight connection therewith.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described an embodiment of the invention.

Of the drawings:

Fig. 1 is a plan view, partly in section, of a marine type superheater constructed and assembled in accordance with the present invention;

Fig. 2 is an enlarged plan view, partly in section, of the manifold of my invention shown in Fig. 1;

Fig. 3 is an end view of the manifold shown in Fig. 2 with the superheater tubes removed therefrom; and Fig. 4 is an enlarged elevation view, in section, of a portion of a header taken on the line 4—4 of Fig. 1.

The present invention can be applied to tube connections in many types of installations, but it is particularly applicable to, and is illustrated in the drawings as applied to, the superheater connections of a marine boiler installation. One arrangement of a convection type superheater in a marine boiler is illustrated in U. S. Patent 2,165,258. In this type of installation and in most marine boiler applications, the superheater tubes are arranged in closely spaced superposed rows with a plurality of closely spaced tubes in each row. The superheater tubes extend transversely across the flow path of heating gases and lie in planes transverse to the axes of adjacent steam generating and downcomer tubes of the boiler. The superheater inlet and outlet headers are located out of the path of heating gas flow and are usually upright or upwardly inclined in planes perpendicular to the planes of the axes of the tubes of the superheater.

As shown in Fig. 1, a row of superheater tubes 10, 11 and 12 extend transversely across a heating gas flow path which is bounded by spaced substantially upright walls 14 and 15. In the embodiment shown, the multiple loop tubes of each superheater tube row lie in a generally horizontal plane, with the superposed rows of tubes closely spaced. The tube rows are arranged in parallel with the tubes in each row equally spaced and the tubes in adjacent rows may be in alignment where the spacing between the rows is equal to the tube to tube spacing in the rows. The tubes in adjacent rows may also lie on centerlines the planes of which are normal to the other tube rows. Whatever the relationship of tube rows, the inlet and outlet headers 16 and 17 of the superheater are generally perpendicular to the planes of the superheater tube rows.

In marine boilers the superheater headers are ordinarily positioned adjacent one wall of the boiler with superheater tube replacement facilitated by the removal of wall panels in the burner side of the boiler setting, with the tubes installed and removed through this setting wall opening. The wall construction typical of this type of marine boiler installation is well known and is not shown in the drawings. Such removable wall panels are positioned in the boundary wall indicated at 15. The wall 14 is formed in part by a spaced series of wall tubes 18 positioned in a row between the inlet and outlet legs of the superheater tubes. Narrow plates 20 are welded to the wall tubes 18 so as to overlappingly engage and form a closure for the intertube spaces between the wall tubes. The tube spacing between the end tubes 18 and tubes 21 is greater than that between adjacent tubes 18 to permit the insertion of a superheater tube row therebetween. A series of plates 22 are provided to close the intertube space between tubes 18 and 21. The plates 22 are supported by a series of brackets 23 which are welded at right angles to the plate 22 and are secured to the tube header manifold elements 24. The plates 22 are provided with openings through which the superheater tubes 10, 11 and 12 of each row extend. The number of plates 22 corresponds with the number of manifold elements 24, and the plates are arranged in generally vertical abutting relationship to present a substantially continuous wall between the superheater tubes and the wall tubes 18 and 21.

With the wall construction described, the portion of the wall 14 in the vicinity of the superheater is not gas-tight but it is customary to provide a gas tight structure (not shown) exteriorly enclosing the headers 16 and 17 as well as the portion of the wall 14 adjacent the headers 16 and 17.

As shown in Fig. 1, the superheater tubes are looped with each tube having two loops adjacent the wall 15 and an intermediate loop adjacent the wall portion 14. The tube loops are supported by relatively large diameter water tubes 26 which form part of the circulatory system of the marine boiler. Two sets of tube supports 27 and 28 engage the superheater tube loops to maintain the intertube relationship of the tubes during boiler operation.

The tube supports 27 are formed from a plate member which is provided with openings slightly greater than the exterior diameter of the superheater tubes and which are spaced to correspond with the tube spacing of the superheater tubes. Each of the plate members is loosely supported between blocks 30 which are welded to a tube 26. The combination of the plate with the blocks 30 permits movement of the superheater tubes relative to the support in a direction axially of the superheater tubes. The tube support members 28 consist of a pair of vertically spaced fingers extending transversely across a tube row in closely spaced vertical association therewith. Each of the pairs of fingers are welded to a support tube 26.

With the tube support structure described, a row or rows of superheater tubes, with their corresponding header manifolds, can be removed from the unit without disassembling the tube supports 27 and 28. The tube support plate 27 is retained with the superheater tube rows while the blocks 30 remain on the tubes 26 during tube removal, while the tube support member 28 remain in position on the tubes 26.

The manifold 24 is constructed with a hollow cylindrical neck portion 29, and an outwardly tapering base portion 31. The base portion is provided with a tube receiving end surface 32 of generally rectangular shape having sufficient area to accommodate two rows of superheater tubes, i. e. a total of 6 tubes. As shown in Figs. 2, 3 and 4, a recess is formed in the end surface 32 of the manifold for each of the superheater tubes in the two rows. The recesses are spaced to correspond with the superheater tube spacing and provide counter sunk seats 33, 34 and 35 for tubes 10, 11 and 12 respectively of row A, and tube seats 36, 37 and 38 for the downwardly adjacent row B of superheater tubes.

The cylindrical neck poprtion 29 is provided with a bore 40 having a cross-sectional area substantially equal to the sum of the flow areas of the superheater tubes connected with the manifold, and each of the manifold tube connections is provided with a flow passageway connecting the tube seats with the bore 40. In the embodiment shown, the passageway 39 connecting the recess tube seat 37 is formed as an extension of the connecting superheater tube, and in merging with the bore 40 is tangential with respect to the lower wall thereof (see Fig. 4). The passageways 41 and 42, connecting the recesses of tube seats 36 and 38 with the bore 40, converge in a substantially horizontal plane, with the included angle therebetween approximating 40°. The passageways 43, 44 and 45 connecting the recesses of the seats 33, 34 and 35, respectively with the bore 40, lie in an inclined plane with the passageways 43 and 45 converging toward the axis of the bore 40.

The offset relationship of the axial centerline of the neck portion 29 with respect to the geometric center of the surface 32 is of advantage in the fabrication of the manifold. With the passageways 39, 41 and 42 lying in a plane normal to the face 32 of the manifold, and parallel to the longitudinal axis of the bore 40, a boring machine can be easily adjusted to obtain the proper converging angle for the passageways 41 and 42. The boring machine must, however, be set to two angles to bore each of the passageways 43, 44 and 45, with one of the angles common to each and the other angle set so the passageways 43 and 45 converge in the common plane. In so far as the functioning of the manifold is concerned the arrangement described can be altered with all of the passageways converging toward the bore 40, as for example, along the slope of a cone or pyramid. However, to minimize fluid flow pressure drop in the manifold, the angles of convergence should be low. Converging angles with respect to the longitudinal axis of the bore 40 of the order of 20 to 25 degrees have been found to be satisfactory.

The superheater tubes are advantageously fitted against their individual tube seats and seal welded to the manifold, as indicated at 46 in Figs. 2 and 4, before each assembly of a tube group and the tube end manifolds 24 is connected with the superheater headers.

As shown in Figs. 1 and 2, the manifold connections to the headers 16 and 17 are non-radial, and as shown in Fig. 2, the internal side of the header wall is countersunk to provide a surface normal to the axis of the manifold header opening. The end 47 of the manifold neck portion 29 is extended into the header, so that after the manifold neck has been expanded, with metal flowing into the grooves 48 of the header wall, the neck is circumferentially welded to the header, as indicated at 50. The neck is thereafter re-expanded to relieve stresses created by the welding operation.

The installed relationship of one embodiment of the superheater tubes, a plurality of manifolds and a header is shown in Fig. 4. As shown, the manifolds 24 are installed in the header wall on a centerline spacing equal to twice the spacing of the superheater tubes, while the spacing of adjacent handholes 52 is double that of the manifold spacing. The tube 11 of the tube row A enters the upper portion of the manifold base, while the tube 11' of the subjacent row B enters the lower portion of the manifold base. Thus in the illustrated embodiment of the invention a group of tubes consisting of 2 rows A and B are connected through a single manifold with a header, and each tube group connects with each header through a manifold.

By way of example and not of limitation, a marine superheater having multiple loop 1 inch O. D. alloy steel tubes arranged on 1½" tube center spacing was connected with an 8¾" I. D. alloy steel header by means of the manifolds described. The center to center spacing of the manifold was 3 inches and the handhole spacing was on 6 inch centers. Under these conditions the perimeter of each manifold connection to the header was easily accessible on the inside of the header from the handholes in the header wall, for welding or expanding, and each tube was also accessible through the manifold for the insertion of a mechanical tube cleaner. Under substantially the same set of circumstances without the use of the manifold connection, experience has proven that it is impossible to obtain a suitably welded connection between the tube ends and the header. This latter condition is primarily due to the transverse dimension of the tube row connections with the header, where the outer sides of the tube to header connections are not accessible to a welding process. Furthermore, the lack of clearance between the closely spaced tube ends also presented difficulties in welding the full circumference of each tube.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. A manifold comprising a hollow cylindrical neck portion and a base portion, said base portion increasing in cross-sectional area from one end of said neck portion, a surface on said base portion lying in a plane substantially normal to the axis of said hollow neck portion, a plurality of spaced tube seats recessed in the surface of said base portion and arranged in parallel rows, and substantially straight passageways of substantially equal flow areas in said manifold base portion connecting each of said recessed seats with said hollow neck portion, the axis of each of the passageways in one row lying in a common plane parallel to the axis of the hollow neck portion and spaced therefrom an amount substantially equal to the radius of said passageways.

2. A manifold comprising a hollow neck portion and a base portion increasing in cross-sectional area from one end of said neck portion, a surface on said base portion lying in a plane substantially normal to the axis of said hollow neck portion, a plurality of spaced tube seats recessed in the surface of said base portion and arranged in parallel rows, substantially straight passageways in said manifold base portion connecting each of said recessed seats with said hollow neck portion, the axes of the passageways connecting the tube seat recessing of one row lying in a common plane parallel to the axis of said neck portion and spaced therefrom with the inner wall of each passageway in said row tangent to a common plane tangent to the inner wall of said hollow neck portion, the axes of the passageways connecting the tube seat recesses of another row lying in a common plane converging toward the axis of said neck portion.

3. A manifold according to claim 2 wherein the angle of convergence of each passageway axis is less than 25 degrees with respect to an adjacent passageway axis lying in a common plane.

References Cited in the file of this patent

UNITED STATES PATENTS

| | | |
|---|---|---|
| 320,635 | Daudt | June 23, 1885 |
| 545,376 | Petersen | Aug. 27, 1895 |
| 884,326 | Emery | Apr. 7, 1908 |
| 1,729,259 | Jacobus | Sept. 24, 1929 |
| 1,814,707 | Kerr et al. | July 14, 1931 |
| 1,858,363 | Kerr | May 17, 1932 |
| 1,882,116 | Bryan | Oct. 11, 1932 |
| 1,989,996 | Mautsch | Feb. 5, 1935 |
| 2,015,328 | Wood | Sept. 24, 1935 |
| 2,033,077 | Kerr et al. | Mar. 3, 1936 |
| 2,058,041 | Shane et al. | Oct. 20, 1936 |
| 2,186,904 | Jones et al. | Jan. 9, 1940 |
| 2,243,430 | Lucke | May 27, 1941 |
| 2,328,039 | Tooney et al. | Aug. 31, 1943 |
| 2,359,589 | Smith et al. | Oct. 3, 1944 |
| 2,412,568 | Donahue et al. | Dec. 17, 1946 |
| 2,458,343 | Carleton | Jan. 4, 1949 |
| 2,560,063 | Armacost | July 10, 1951 |

FOREIGN PATENTS

| | | |
|---|---|---|
| 8,437 | France | Apr. 3, 1908 |